Feb. 3, 1959 — G. M. HOLLEY, JR — 2,871,845

FUEL INJECTION SYSTEM

Filed Feb. 20, 1956 — 3 Sheets-Sheet 1

INVENTOR.
GEORGE M. HOLLEY JR.
BY Whittemore,
Hulbert & Belknap
ATTORNEYS

Feb. 3, 1959 G. M. HOLLEY, JR 2,871,845
FUEL INJECTION SYSTEM
Filed Feb. 20, 1956 3 Sheets-Sheet 2

INVENTOR.
GEORGE M. HOLLEY JR.
BY Whittemore,
Hulbert & Belknap
ATTORNEYS

Feb. 3, 1959 G. M. HOLLEY, JR 2,871,845
FUEL INJECTION SYSTEM
Filed Feb. 20, 1956 3 Sheets-Sheet 3

INVENTOR.
GEORGE M. HOLLEY JR.
BY Whittemore,
Hulbert & Belknap
ATTORNEYS

United States Patent Office 2,871,845
Patented Feb. 3, 1959

2,871,845
FUEL INJECTION SYSTEM

George M. Holley, Jr., Grosse Pointe, Mich., assignor to Holley Carburetor Company, Van Dyke, Mich., a corporation of Michigan Application February 20, 1956, Serial No. 566,631

19 Claims. (Cl. 123—139)

The present invention relates to a fuel injection system.

It is an object of the present invention to provide a fuel injection system comprising means for metering liquid internal combustion engine fuel in accordance with requirements, means for effecting sequential division of the metered flow of fuel, and means for injecting the sequentially divided fuel to different zones of use.

More specifically, it is an object of the present invention to provide a fuel injection system for an internal combustion engine having a plurality of combustion chambers which comprises establishing a flow of liquid fuel under a relatively low controlled pressure, metering the low pressure flow of fuel in accordance with engine demand, dividing the entire flow serially into separate charges, and sequentially injecting the separated charges for use in the engine cylinders.

It is a further object of the present invention to provide in a fuel injection system, a flow divider comprising a rotary member adapted to be driven in accordince with engine speed, a flow passage in said rotary member having one end connected to a metered flow of fuel, and a plurality of ports sequentially engageable by the opposite end of said flow passage for receiving the flow of fuel through said flow passage in a continuous series of separated charges.

It is a further object of the present invention to provide in a fuel injection system, a flow divider operable in accordance with engine speed to divide a continuous flow of fuel into serially related charges, and means responsive to engine speed for effecting an increase in pressure of the fuel in said flow divider to insure proper operation at high engine speed.

Other objects and features of the invention will become apparent as the description proceeds, especially when taken in conjunction with the accompanying drawings, wherein.

Described in general terms, in the present fuel injection system fuel is pumped from a tank to a metering unit which may be responsive to engine speed, manifold pressure, air flow, temperature, inlet density, and/or other commonly used signals so that any or all of the above signals determines the quantity of fuel to be delivered to the engine. The correct quantity of fuel as thus metered flows continuously out of the metering system to a flow divider which mechanically or otherwise, divides the entire flow sequentially or serially into uniform charges in accordance with the number of cylinders or groups of simultaneously charged cylinders in the internal combustion engine. Associated with the flow divider is a positive displacement injection pump for each cylinder or groups of simultaneously charged cylinders. The pump has a pumping chamber of variable volume. The amount of fuel that flows into the chamber is determined by the fraction of the total fuel flow being delivered by the metering unit. Once the variable volume chamber is charged with the correct amount, mechanical means then forces that amount of fuel out to the engine through a pressure loaded nozzle. Conveniently, the variable volume chamber may be formed by a piston and cylinder, the piston being displaced against relatively low resistance by the flow of a measured charge of fuel into the cylinder, after which the piston is positively mechanically moved to deliver the measured charge of fuel under high pressure to the injection nozzle.

Figure 1:
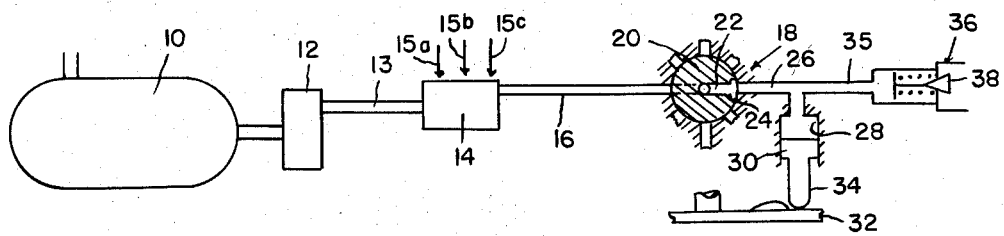
Figure 1 is a diagrammatic drawing of the fuel injection system.

Referring now to Figure 1, the injection system is illustrated as comprising a fuel tank 10 delivering fuel to a fuel pump 12 which in turn delivers a continuous flow of fuel at relatively low pressure through a line 13 to a metering unit 14. In this diagrammatic view the reference numerals 15a, 15b and 15c designate incoming control signals such for example as engine speed, manifold pressure, air flow, temperature, inlet density, etc. which control the metering unit 14. It will be understood that this metering unit may be of conventional type and applicant makes no claim to details thereof.

The continuous flow of fuel delivered by the metering unit 14 flows through a line 16 to a flow divider indicated diagrammatically at 18. Details of a preferred form of flow divider will be subsequently described, but for the purpose of the present description, the flow divider comprises basically a rotary member or rotor 20 connected to be positively driven by a rotating part of the internal combustion engine to which the injection system supplies fuel. Accordingly, the speed of the rotor 20 is directly dependent upon engine speed. The rotor 20 has therein a fuel flow passage 22 connected at one end to the line 16 and having a circumferentially enlarged chamber 24 at its other end serially engageable with ports of passages 26. The passages 26 each lead to a variable volume chamber comprising a part of a fuel injection pump. One of such chambers is illustrated at 28 in Figure 1 as comprising a cylinder in which is movable a piston 30. A rotating part of the internal combustion engine actuates a cam 32 which in its rotation moves away from a cam follower portion 34 of the piston 30 to permit movement of the piston in a direction to enlarge the pumping chamber 28 as required to accommodate flow thereinto of a divided charge of fuel from the flow divider 18. Continued rotation of the cam 32 brings the cam again into engagement with the cam follower 34 and effects positive displacement of the metered and divided charge of fuel in the pumping chamber 28 to a line 35 connecting to a nozzle 36 which includes a spring loaded valve 38.

With the system as thus described it will be observed that relatively low pressure fuel is supplied to the metering unit 14 which maintains the flow of fuel to a continuous flow, the quantity of which is determined by engine demand. In this connection, engine demand will be understood to include a condition in which the metering of the fuel is accomplished manually under the control of the operator. In either case, fuel is delivered through the line 16 in a metered quantity to the flow divider 18 which divides the entire flow sequentially into a series of charges which are separately delivered to variable volume, positive displacement pumping chambers which thereafter deliver the metered and serially divided charges under high pressure through injection nozzles to the separate cylinders or groups of simultaneously charged cylinders as required.

Figure 2:
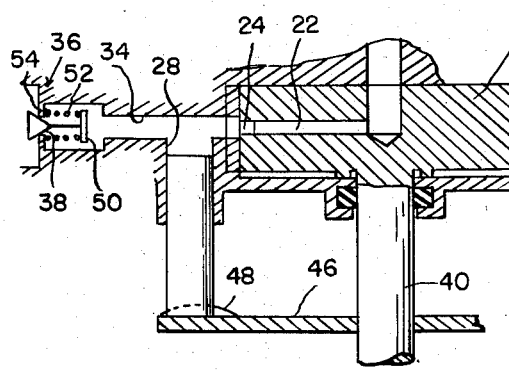
Figure 2 is a diagrammatic sectional view of the flow divider employed in the fuel injection system.

Referring now to Figure 2, there is an enlarged diagrammatic sectional view of the flow divider which shows the rotary member 20 as connected to a shaft 40 which is connected to a rotating part of the internal combustion engine. The rotary member 20 is of cylindrical shape and rotates within a sleeve 42 having ports 44. The flow passage 22 is illustrated in this figure as is the circumferentially enlarged chamber 24 adapted to communicate sequentially with the ports 44 of the sleeve 42.

Conveniently, the cam which is diagrammatically represented at 32 in Figure 1, may take the form of a radial arm 46 connected to the shaft 40 and carrying the camming element 48 thereon. In this figure the cylinder or pumping chamber 28 is diagrammatically illustrated but the detail of the piston is omitted. The cylinder 28 is shown as connecting through the line 34 to the injection nozzle 36 and the pressure loaded valve 38 is shown as having a head 50 engageable by a compression spring 52 the opposite end of which seats around the nozzle port 54.

Figure 3:
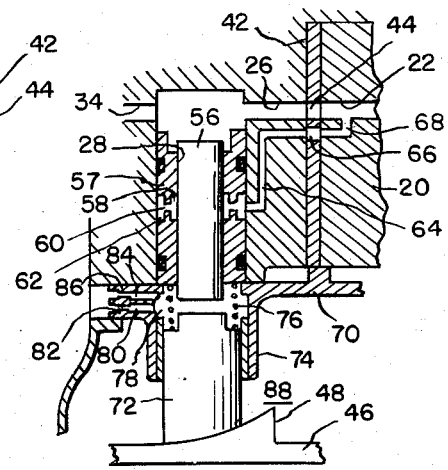
Figure 3 is a diagrammatic sectional view of a positive displacement injection pump and flow divider employed in the fuel injection system.

Referring now to Figure 3, there is a diagrammatic showing of the details of the injection pump. In this figure the sleeve 42 is illustrated, the port 44 therein communicating with the flow passage 22 of the rotary member 20. The port 44 connects the flow passage 22 to the passage 26 which provides for flow of fuel to the injection pump. As seen in this figure, the piston and cam follower are in the form of separate elements. The piston 56 is movable in the cylinder 28 formed in a sleeve member 57. The cylinder 28 is provided with an annular recess 58 connected by passages 60 to an annular chamber 62 which in turn connects by a passage 64 through a short passage 66 in the bearing sleeve 42 and a passage 68 to the fuel flow passage 22. This allows any fuel leaking past the piston 56 from the cylinder 28 during the pumping stroke to pass back to the main system.

The structure includes a support 70 which holds the bearings and sleeve in place.

Associated with the piston 56 is the cam follower 72 movable in a sleeve portion 74 of the support 70. Interposed between the sleeve member 57 and the cam follower 72 is a compression spring 76 urging the cam follower downwardly as seen in the figure. Accordingly, the cam follower when permitted by the cam 48, moves downwardly away from the piston 56 under the influence of the spring 76. The piston 56 is thus free, except for the slight friction between it and the cylinder 28, to be displaced downwardly by the mere admission of the metered and divided charge of low pressure fuel to the pumping chamber and only to the extent required to accommodate this fuel. Rotation of the arm 46 moves the cam 58 and the cam follower 72 to effect positive movement of the piston 56 upwardly and thus to effect positive displacement of fuel through the line 34 to the injection nozzle.

The support 70 is formed to provide an annular chamber 78. The chamber 78 is connected by a passage 80 provided with a restriction 82 to permit any fuel leaking past the piston 56 to be drained off. The chamber 78 may if desired be vented to drain to the manifold. In this case a passage 84 adapted to be connected to the manifold may be provided and a restriction 86 provided to control the effect of the high manifold vacuum.

Since the chamber 78 collects any fuel leaking past the piston 56, the chamber 88 in which the cam 48 is rotating, can be lubricated to prevent wear of the parts without fear of dilution or contamination by gasoline or without contaminating the fuel supplied to the engine.

Figure 4:
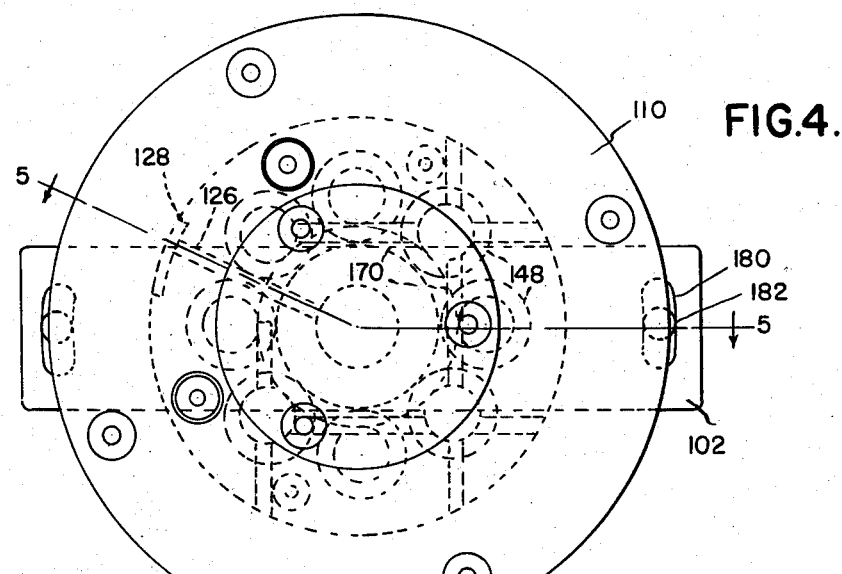
Figure 4 is a plan view of the flow divider and injection pump.
Figure 5:
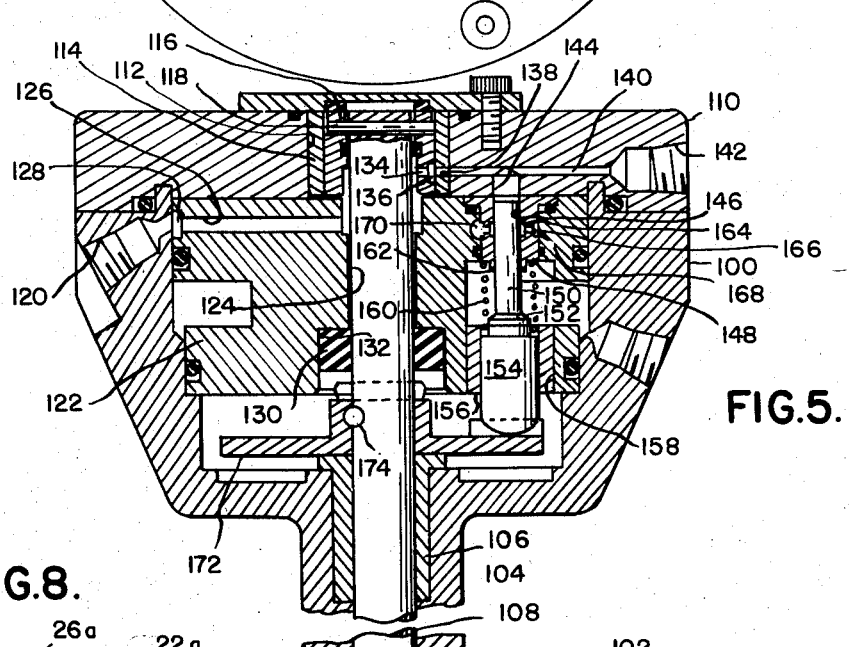
Figure 5 is a sectional view on the line 5—5, Figure 4.

The foregoing description is based upon diagrammatic views intended to provide a simple illustration of the system. Reference is now made to Figures 4 and 5 which show a practical embodiment of a combined flow divider and injection pump. The combined flow divider and injection pump comprises a main body 100 in the form of a casting having a mounting base 102 connected to the main body by a tubular portion 104. Received within the tubular portion 104 is a shaft bearing 106 and rotatable within the bearing 106 is a shaft 108 adapted to be connected to a rotating part of the internal combustion engine for which the system is designed.

The interior of the body 100 is open and is adapted to be closed by a removable head 110. The head 110 is in turn provided with a central cylindrical opening 112 in which is located a bushing 114 which corresponds to sleeve 42. A tubular cylindrical distributor valve 116 is rotatable within the bushing 114 and is pinned or otherwise fixedly secured to the shaft 108 as indicated at 118, to be driven at a speed dependent upon engine speed.

A continuous metered flow of fuel is introduced into the interior of the body 100 through a passage 120. Located within the hollow interior of the body 100 and beneath the head 110 is a piston holder 122 having a central opening 124 for the reception of the shaft 108 and having a radial passage 126 connected to a circumferentially extended chamber 128 which communicates with the inner end of the passage 120. As a result of this arrangement the continuous metered flow of fuel flows to the central opening in the piston holder 122 and thence to the interior of the distributor valve 116. A shaft seal 130 is provided in a recess 132 at the lower end of the piston holder.

In the device shown in Figures 4 and 5 the combined flow divider and injection pump mechanism is designed to divide the flow into eight paths in a sequential or serial repeating pattern. Accordingly, eight separate pumping constructions are employed, one being shown at the right hand side of Figure 5. The distributor valve 116 is provided with a radial passage 134 communicating with a circumferentially enlarged chamber 136. The sleeve or bushing 114 has a plurality, and in the illustrated embodiment eight, of radial passages 138 each of which communicates with a generally radially extending passage 140 in the head 110. The passages 140 at their outer ends are tapped as indicated at 142 for connection to separate conduits leading to the pressure loaded nozzles previously described. The head 110 is provided with vertical passages 144 communicating respectively with the radial passages 140 and each of the passages 144 communicates with the bore or cylinder 146 of a sleeve member 148 corresponding to the sleeve member 57 shown in Figure 3.

Vertically movable within the cylinder 146 is a piston 150 the lower end of which is provided with a head 152 having a one-way engagement with a cam follower 154. The cam follower 154 is vertically movable in a bushing 156 provided in an opening 158 in the piston holder 122. A compression spring 160 is provided engageable at its lower end with the upper end of the cam follower 154 and having its upper end surrounding a spring pilot 162 formed at the lower end of the sleeve member 148.

It will be observed that the sleeve member 148 intermediate its ends is provided with an annular chamber 164 communicating by radial passages 166 with an external annular chamber 168 which in turn communicates with a passage 170 adapted to collect fuel leaking past the piston 150. As best illustrated in Figure 4, the passages 170 may be provided to cooperate with a plurality of sleeve members 148, the illustrated arrangement being such that four such passages are sufficient to connect the eight pumping elements to drain. It will be appreciated that the passages 170 correspond to the passage 64 in Figure 3.

Carried by the shaft 108 is a cam 172, the cam being illustrated as pinned, as indicated at 174, to the shaft to be driven thereby. It will further be appreciated that the cam 172 contains one or more cam risers effective to operate the pistons 150 in a predetermined sequence. If a single cam rise is provided, as will be the case when a single passage 134 is provided in the distributor valve, each of the pistons will be actuated in a predetermined sequence.

In operation the angular extent of the chamber or recess 136 is designed to provide for a continuous flow of fuel. In other words, as the chamber 136 passes out of communication with one of the passages 138 in the bushing 114, it will substantially simultaneously come into communication with the next adjacent passage. By this means a continuous flow of fuel to the flow divider from the metering mechanism is sequentially interrupted and diverted into a plurality of different paths. This division of the fuel into separate charges occurs at low pressure and each charge passes into one of the radial passages 140. Flow through the nozzle at the low pressure provided is prevented by the pressure loaded nozzle. Instead, the charge of fuel is effective to move the piston 150 downwardly. Resistance to movement of the piston by friction or otherwise is such that the piston is displaced only by the amount necessary to accommodate the quantity of fuel delivered to the chamber 144 during movement of the passage 134 past the port provided by the passage 138. At this time the associated cam follower 154 has been moved downwardly by the spring 160 out of engagement with the piston 150. As the rise on the cam 172 next engages the cam follower 154, the piston 150 is positively displaced upwardly. At this time the passage 134 is out of communication with the passage 138 and accordingly, the charge of fuel within the cylinder or chamber 144 is positively displaced through the pressure loaded nozzle under the pressure required to overcome the spring loading thereof.

The entire head and body assembly may be adjusted angularly relative to the rotating part of the device to effect timing of the fuel injection and for this purpose the base is provided with elongated arcuate slots 180 for receiving mounting screws 182.

While the system as described above operates satisfactorily, conditions may be encountered which require a further refinement of the system. When the system is used on an engine with a very high speed or with a very large displacement, the inlet pressure of the fuel from the fuel pump 10 and metering unit 14 through passages 16 and 22, may be insufficient to increase the volume of the pumping chamber (as by moving the piston 30 downwardly in Figure 1) during the time interval available. When this condition is incurred a back pressure tends to develop in lines 16 and 22 which will reduce or stop the flow of fuel. To overcome this the mechanism illustrated in Figures 6 and 7 may be provided.

Figure 6:
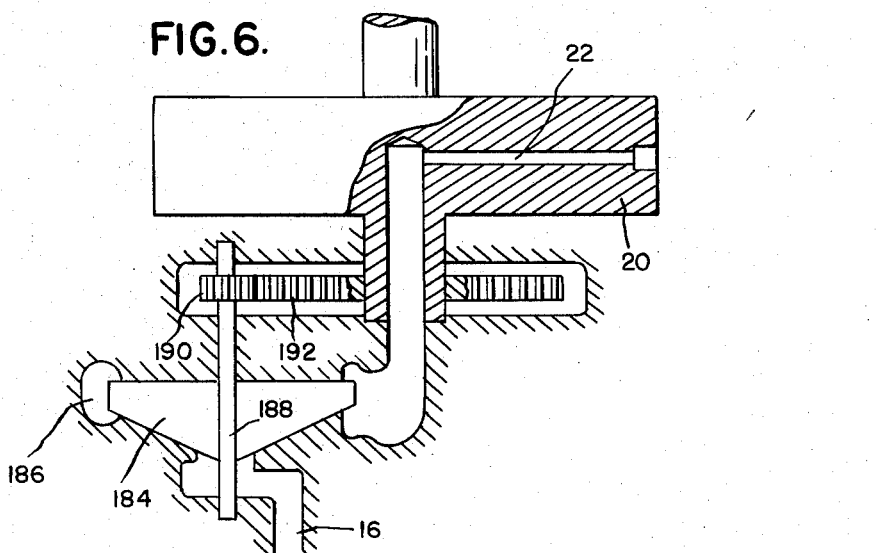
Figure 6 is a diagrammatic view showing a booster for improving operation of the flow divider at high engine speed.

As seen in Figure 6, a centrifugal impeller 184 is connected between the passage 16 and the passage 22. As illustrated, the impeller 184 discharges into an annular chamber 186 which connects to the axial extension of the passage 22. The impeller is driven by a shaft 188 having a pinion 190 thereon in mesh with a driving gear 192 carried by and rotatable with the rotor or distributor valve 20.

With this construction it will be observed that at high speed, the pressure built up by the centrifugal impeller increases with speed and produces fuel pressures sufficiently great to provide the required force to accelerate the piston 30 downwardly as seen in Figure 1, during the available time interval.

Figure 7:
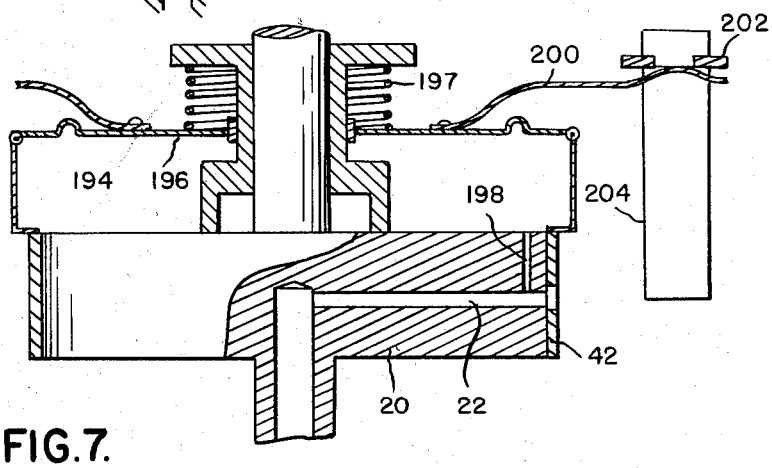
Figure 7 is a diagrammatic view showing a different embodiment of booster for improving operation of the flow divider at high engine speed.

Referring now to Figure 7, the distributor valve 20 is illustrated together with the radial passage 22 which communicates sequentially with the several pumping chambers. Associated with the rotary distributor valve 20 is a chamber 194 one side of which is formed by a flexible diaphragm 196. A light compression spring 197 is provided urging the flexible diaphragm in a direction tending to reduce the volume of the chamber 194. The distributor valve 20 is provided with a passage 198 which communicates with the chamber 194 and subjects the chamber to back pressure within the passage 22. Carried by the flexible diaphragm 196 are leaf springs 200 the free ends of which bear against snap rings 202 carried by the pistons 204 which correspond to the piston 30 shown in Figure 1. The springs 200 bias the pistons 204 in a direction causing enlargement of the pumping chamber. Under conditions as previously described which result in the building up of back pressure within the lines 22 and 16, this increased back pressure is available against the flexible diaphragm 196 tending to increase the force of the springs 200 tending to move the pistons 204 in a direction corresponding to movement of the piston 30 downwardly.

The constructions illustrated in Figures 6 and 7 are illustrative of means responsive to engine speed or directly responsive to conditions variable with engine speed effective to establish forces assisting movement of the pistons in a direction to increase the volume of the pumping chambers.

Figure 8:
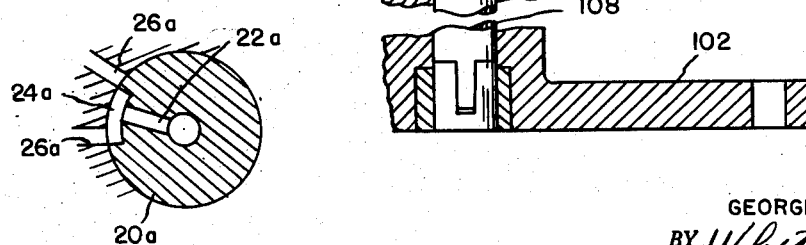
Figure 8 is a fragmentary diagrammatic view illustrating a preferred arrangement of the flow divider.

Referring now to Figure 8 there is illustrated a useful arrangement in which the rotor 20a is provided with the metering passage 22a communicating with the circumferentially enlarged chamber 24a. As seen in this figure, the circumferential dimension of the chamber 24a is such that as the flow of fuel to one of the passages 26a is terminated, the succeeding passage 26a is correspondingly opened to the flow. With this arrangement it will be observed that a uniform and continuous or substantially uniform and continuous flow of fuel through the passage 22a is provided. This is desirable since it simplifies the metering of the overall quantity of fuel delivered to the engine. It is not however, an absolutely essential requirement provided the metering unit can accommodate an intermittent flow.

The drawings and the foregoing specification constitute a description of the improved fuel injection system in such full, clear, concise and exact terms as to enable any person skilled in the art to practice the invention, the scope of which is indicated by the appended claims.

What I claim as my invention is:

1. A fuel injection system for an internal combustion engine comprising a metering device, means for supplying fluid fuel to said device under pressure, a flow divider connected to said metering device to receive fuel therefrom and to divide it into a plurality of substantially equal portions, a plurality of variable volume pumping chambers connected to said flow divider to receive series of divided portions of the metered flow, each of said chambers being substantially freely expansible to accommodate the exact quantity of fuel metered thereto, positive acting means connected to each of said pumping chambers to reduce the volume of said chambers to expel the fuel therefrom.

2. A fuel injection system for an internal combustion engine comprising a metering device, means for supplying fluid fuel to said device under pressure, a flow divider connected to said metering device to receive fuel therefrom and to divide it into a plurality of substantially equal portions, a plurality of variable volume pumping chambers connected to said flow divider to receive series of divided portions of the metered flow, each of said chambers being substantially freely expansible to accommodate the exact quantity of fuel metered thereto, positive acting means operable in accordance with engine speed connected to each of said pumping chambers to reduce the volume of said chambers to expel the fuel therefrom.

3. A fuel injection system for an internal combustion engine comprising a source of liquid fuel under pressure, a flow meter connected to said source to meter a substantially continuous flow of fuel in accordance with engine requirements, a plurality of variable volume positive displacement pumps, and a flow divider connected between said meter and pumps to direct the flow of fuel sequentially to said pumps.

4. A fuel injection system for an internal combustion engine comprising a source of liquid fuel under pressure, a flow meter connected to said source to meter a substantially continuous flow of fuel in accordance with engine requirements, a plurality of variable volume positive displacement pumps, and a flow divider connected between said meter and pumps to direct the flow of fuel sequentially to said pumps, said pumps having expansible and contractable pumping chambers and being substantially freely expansible to accommodate the quantity of fuel apportioned thereto by said flow divider.

5. A fuel injection system for an internal combustion engine comprising a source of liquid fuel under pressure, a flow meter connected to said source to meter a substantially continuous flow of fuel in accordance with engine requirements, a pluraltiy of variable volume positive displacement pumps, and a flow divider connected between said meter and pumps to direct the flow of fuel sequentially to said pumps, said pumps having expansible and contractable pumping chambers and being substantially freely expansible to accommodate the quantity of fuel apportioned thereto by said flow divider, each of said pumps comprising positive acting means operated in accordance with engine speed for contracting the chamber by the amount of its expansion by the flow of fuel thereto.

6. A fuel injection system for an internal combustion engine comprising a source of liquid fuel under pressure, a flow meter connected to said source to meter a substantially continuous flow of fuel in accordance with engine requirements, a plurality of variable volume positive displacement pumps, a flow divider connected between said meter and pumps to direct the flow of fuel sequentially to said pumps, said pumps having expansible and contractable pumping chambers and being substantially freely expansible to accommodate the quantity of fuel apportioned thereto by said flow divider, and means responsive to engine speed to assist the expansion of said pumping chambers.

7. A system as defined in claim 6 in which the means responsive to engine speed comprises a booster pump connected between said meter and divider.

8. A system as defined in claim 6 in which the means responsive to engine speed comprises resilient means connected to said chambers and means for increasing the effectiveness of said resilient means upon development of back presure in the fuel flowing to said flow divider.

9. A flow divider for an internal combustion engine for dividing a metered flow of fuel into metered charges comprising a body having a plurality of pumping chambers, each of said pumping chambers having a substantially freely movable wall to vary the volume of said chamber, cam means operable in accordance with engine speed having one-way connection with said wall to move said wall to contract said chamber and to move away from said wall to permit it to move to expand said chamber, valve means for connecting the metered flow of fuel to said chambers in a repeating sequence in accordance with engine speed, said movable walls being movable by flow of fuel into the chambers only to the extent required to accommodate the metered charge thereof.

10. A flow divider for an internal combustion engine for dividing a metered flow of fuel into metered charges comprising a body having a plurality of pumping cylinders, each of said cylinders having a substantially freely movable piston to vary the volume of said cylinder, cam means operable in accordance with engine speed having one-way connection with said piston to move said piston to contract said cylinder and to move away from said piston to permit it to move to expand said cylinder, valve means for connecting the metered flow of fuel to said cylinders in a repeating sequence in accordance with engine speed, said movable pistons being movable by flow of fuel into the cylinders only to the extent required to accommodate the metered charge thereof.

11. A flow divider for an internal combustion engine comprising a body having a rotary shaft therein adapted to be connected to a rotating part of the engine, a plurality of pump cylinders disposed about the axis of said shaft, pistons in said cylinders, a cam on said shaft having one-way driving connection with said pistons to move said pistons sequentially in pumping strokes, a chamber within said body, a passage for supplying fuel to said chamber, separate passages extending from said chamber to said cylinders, a valve connected to said shaft interposed between said chamber and said separate passages and having a port for sequentially connecting said chamber to said separate passages for dividing the fuel flow into apportioned charges, said pistons being movable in suction strokes solely by the pressure of the fuel admitted to the separate cylinders by said valve.

12. A flow divider for an internal combustion engine comprising a body having a rotary shaft therein adapted to be connected to a rotating part of the engine, a plurality of pump cylinders disposed about the axis of said shaft, pistons in said cylinders, a cam on said shaft, cam followers having one-way driving connection with said pistons to move said pistons sequentially in pumping strokes, resilient means urging said cam followers toward said cam, a chamber within said body, a passage for supplying fuel to said chamber, separate passages extending from said chamber to said cylinders, a valve connected to said shaft interposed between said chamber and said separate passages and having a port for sequentially connecting said chamber to said separate passages for dividing the fuel flow into apportioned charges.

13. A flow divider for an internal combustion engine comprising a body having a rotary shaft therein adapted to be connected to a rotating part of the engine, a plurality of pump cylinders disposed about the axis of said shaft, pistons in said cylinders, a cam on said shaft, cam followers having one-way driving connection with said pistons to move said pistons sequentially in pumping strokes, resilient means urging said cam followers toward said cam, a chamber within said body, a passage for supplying fuel to said chamber, separate passages extending from said chamber connecting with said cylinders and continuing to the outside of said body for connection to pressure loaded distribution lines, a valve connected to said shaft interposed between said chamber and said separate passages and having a port for sequentially connecting said chamber to said separate passages for dividing the fuel flow into apportioned charges.

14. A fuel injection system for an internal combustion engine comprising a low pressure supply pump, a meter connected to said pump to meter a substantially continuous flow of fuel in accordance with engine demand, a flow divider connected to said meter to receive the substantially continuous flow therefrom and to divide the entire flow sequentially into separate charges, and a plurality of positive displacement pumps connected to said divider to receive said divided charges and to inject them in their entirety under high pressure.

15. A fuel injection system for an internal combustion engine comprising a low pressure supply pump, a meter connected to said pump to meter a substantially continuous flow of fuel in accordance with engine demand, a flow divider connected to said meter to receive the sub stantially continuous flow therefrom and to divide the entire flow sequentially into separate charges, a plurality of positive displacement pumps connected to said divider to receive said divided charges and to inject them in their entirety under high pressure, and pressure loaded nozzles connected to said pump through which the charges are injected.

16. A fuel injection system for an internal combustion engine comprising a low pressure supply pump, a plurality of fuel pumps, a meter connected between the said supply pump and said fuel pumps to meter a substantially continuous flow of fuel in accordance with engine requirements, a flow divider connected between said meter and said pumps to receive the substantially continuous flow of fuel from said meter and to divide the entire flow into separate charges and to deliver said divided charges to said fuel pumps in sequence, and means for actuating said pumps in the same sequence to pump said divided charges to the engine.

17. A fuel injection system for an internal combustion engine comprising a low pressure supply pump, a plurality of cylinders, pistons in said cylinders freely displaceable by flow of fuel into said cylinders, a meter connected between the supply pump and cylinders to meter a substantially continuous flow of fuel in accordance with engine requirements, a flow divider connected between said meter and said cylinders to receive the substantially continuous flow of fuel from said meter and to divide the entire flow into separate charges and to deliver said divided charges to said cylinders in sequence, and means for actuating the pistons in said cylinders in pumping strokes in the same sequence to pump said divided charges to the engine.

18. A fuel injection system for an internal combustion engine comprising a low pressure supply pump, a plurality of cylinders, pistons in said cylinders freely displaceable by flow of fuel into said cylinders, a meter connected between the supply pump and cylinders to meter a substantially continuous flow of fuel in accordance with engine requirements, a rotary flow divider connected between said meter and said cylinders to receive the substantially continuous flow of fuel from said meter and to divide the entire flow into separate charges and to deliver said divided charges to said cylinders in sequence, said flow divider having an inlet passage in continuous communication with said meter and an outlet passage in continuous communication with one or another of said cylinders, and means for actuating the pistons in said cylinders in pumping strokes in the same sequence to pump said divided charge to the engine.

19. A fuel injection system for an internal combustion engine comprising a low pressure supply pump, a plurality of cylinders, pistons in said cylinders freely displaceable by flow of fuel into said cylinders, a meter connected between the supply pump and cylinders to meter a substantially continuous flow of fuel in accordance with engine requirements, a rotary flow divider connected between said meter and said cylinders to receive the substantially continuous flow of fuel from said meter and to divide the entire flow into separate charges and to deliver said divided charges to said cylinders in sequence, said flow divider having an inlet passage in continuous communication with said meter and an outlet passage in continuous communication with one or another of said cylinders, and means for actuating the pistons in said cylinders in pumping strokes in the same sequence to pump said divided charges to the engine, said flow divider including means effective to interrupt communication between said meter and each of said cylinders during the complete pumping stroke of the pistons therein.

References Cited in the file of this patent

UNITED STATES PATENTS

| | | |
|---|---|---|
| 1,292,981 | Weiss | Jan. 28, 1919 |
| 2,300,313 | Pool | Oct. 27, 1942 |
| 2,405,938 | Beeh | Aug. 20, 1946 |
| 2,452,470 | Johnson | Oct. 26, 1948 |
| 2,641,238 | Roosa | June 9, 1953 |
| 2,720,344 | Isreeli et al. | Oct. 11, 1955 |